United States Patent
Tsuchiya et al.

(10) Patent No.: US 10,516,349 B2
(45) Date of Patent: Dec. 24, 2019

(54) METHOD OF DRIVING VIBRATION ACTUATOR WITH ENHANCED SLIDING EFFICIENCY, VIBRATION DRIVE DEVICE, AND MECHANICAL APPARATUS

(71) Applicant: CANON KABUSHIKI KAISHA, Tokyo (JP)

(72) Inventors: Satoshi Tsuchiya, Inagi (JP); Takao Mori, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 184 days.

(21) Appl. No.: 15/363,504

(22) Filed: Nov. 29, 2016

(65) Prior Publication Data

US 2017/0163176 A1    Jun. 8, 2017

(30) Foreign Application Priority Data

Dec. 4, 2015 (JP) .................... 2015-237395

(51) Int. Cl.
| | |
|---|---|
| *H02N 2/12* | (2006.01) |
| *H02N 2/00* | (2006.01) |
| *H02N 2/10* | (2006.01) |
| *H02N 2/14* | (2006.01) |
| *H02N 2/16* | (2006.01) |

(Continued)

(52) U.S. Cl.
CPC .......... *H02N 2/008* (2013.01); *H02N 2/0015* (2013.01); *H02N 2/106* (2013.01); *H02N 2/12* (2013.01); *H02N 2/14* (2013.01); *H02N 2/163* (2013.01); *H04N 5/23287* (2013.01); *G02B 7/14* (2013.01); *H04N 5/2254* (2013.01); *H04N 5/23209* (2013.01); *H04N 5/23212* (2013.01)

(58) Field of Classification Search
CPC ...... H02N 2/008; H02N 2/0015; H02N 2/106; H02N 2/12; H02N 2/14; H02N 2/163
USPC ....................... 310/323.01–323.21
See application file for complete search history.

(56) References Cited

U.S. PATENT DOCUMENTS

| | | | |
|---|---|---|---|
| 5,256,928 | A | 10/1993 | Nishikura et al. |
| 7,109,639 | B2 | 9/2006 | Yamamoto et al. |

(Continued)

FOREIGN PATENT DOCUMENTS

| | | |
|---|---|---|
| CN | 101160710 A | 4/2008 |
| CN | 101895231 A | 11/2010 |

(Continued)

OTHER PUBLICATIONS

Office Action dated Aug. 2, 2018, in Chinese Patent Application No. 201611075610.3.

(Continued)

*Primary Examiner* — Derek J Rosenau
(74) *Attorney, Agent, or Firm* — Venable LLP

(57) ABSTRACT

A vibration actuator includes a vibration element including a piezoelectric element as an electromechanical energy conversion element and an elastic body which is joined to the piezoelectric element, and a driven element which is brought into pressure contact with the elastic body. Driving vibration is excited in the vibration element by applying a drive signal to the piezoelectric element, whereby the vibration element and the driven element are moved relative to each other. The driving vibration is a vibration in which at least n-th-order vibration and 2n-th-order vibration are combined, n being a natural number.

28 Claims, 12 Drawing Sheets

(51) Int. Cl.
*H04N 5/232* (2006.01)
*G02B 7/14* (2006.01)
*H04N 5/225* (2006.01)

(56) References Cited

U.S. PATENT DOCUMENTS

| | | |
|---|---|---|
| 7,187,104 B2 | 3/2007 | Yamamoto et al. |
| 7,245,058 B2 | 7/2007 | Fujimoto et al. |
| 7,459,832 B2 | 12/2008 | Nitto et al. |
| 7,633,215 B2 | 12/2009 | Nitto et al. |
| 7,911,112 B2 | 3/2011 | Adachi et al. |
| 2013/0113339 A1* | 5/2013 | Kojima ............... H02N 2/0015 310/323.16 |
| 2015/0101085 A1 | 4/2015 | Paige et al. |

FOREIGN PATENT DOCUMENTS

| | | |
|---|---|---|
| CN | 102013832 A | 4/2011 |
| CN | 102307021 A | 1/2012 |
| JP | 3001956 B2 | 1/2000 |
| JP | 2007-202227 A | 8/2007 |
| JP | 4261964 B2 | 5/2009 |
| JP | 4829495 B2 | 12/2011 |
| WO | 2012/133650 A1 | 10/2012 |

OTHER PUBLICATIONS

U.S. Appl. No. 15/266,511, Kei Suefuji, Atsushi Kimura, Takao Mori, Satoshi Tsuchiya, Akira Shimada, filed Sep. 15, 2016.

* cited by examiner

FIG. 9
| $f_{2n}/f_n$ | LOWER THAN 1.85 | 1.85-2.00 | 2.00-2.15 | 2.15-2.30 | HIGHER THAN 2.30 |
|---|---|---|---|---|---|
| SLIDING EFFICIENCY | × | △ | ○ | △ | × |
FIG. 10A
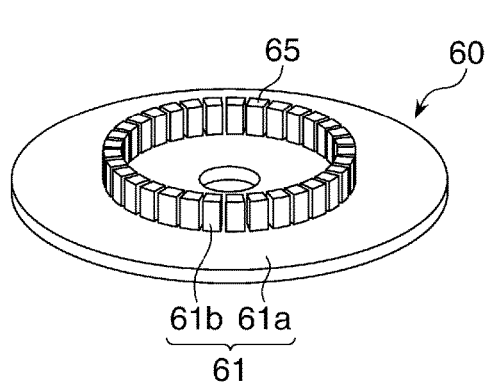
FIG. 10B
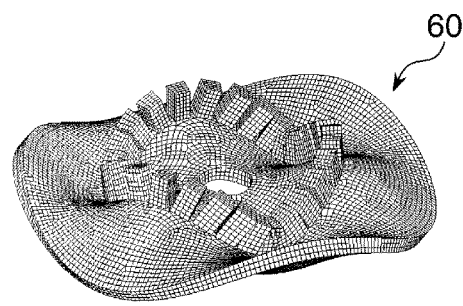
FIG. 10C
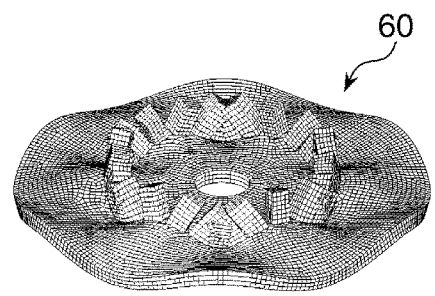

METHOD OF DRIVING VIBRATION ACTUATOR WITH ENHANCED SLIDING EFFICIENCY, VIBRATION DRIVE DEVICE, AND MECHANICAL APPARATUS

BACKGROUND OF THE INVENTION

Field of the Invention

The present invention relates to a method of driving a vibration actuator, a vibration drive device, and a mechanical apparatus equipped with the vibration drive device, and more particularly to a technique for enhancing the sliding efficiency of the vibration actuator to thereby improve the durability thereof.

Description of the Related Art

A vibration actuator that brings a vibration element and a driven element into pressure contact with each other and excites driving vibration in the vibration element to thereby move the vibration element and the driven element relative to each other has such characteristics that the vibration actuator is capable of generating large low-speed torque and holding its state after driving, with a frictional force. By focusing on these characteristics, for example, in an image pickup apparatus, such as a single-lens reflex camera, the vibration actuator has been put into practical use as a lens driving motor for performing an auto-focus operation. Further, in recent years, the vibration actuator is expected to be applied to other uses. For example, the vibration actuator is expected to be applied to the driving of joints of a robot arm, the driving of a robotic hand for rotation, the driving of a photosensitive drum of an image forming apparatus for rotation, the driving of an X-Y stage within a plane, and so on.

To apply the vibration actuator to these other usages, the vibration actuator is demanded to generate larger torque and achieve higher output, and further, is also strongly demanded to improve the sliding efficiency and improve the durability for suppressing the lowering of driving characteristics with time. To meet these demands, it is necessary to suppress the occurrence of an unnecessary slip between the respective contact portions of the vibration element and the driven element brought into contact, to thereby improve the sliding efficiency. Accordingly, for example, for a vibration actuator using bending vibration (vibration causing displacement in a direction normal to a portion of the driving element in contact with the driven element) and stretching vibration (vibration causing displacement in a direction of driving the driven element) as driving vibration, there has been proposed a technique for reducing a slip occurring between the driven element and the vibration element by generating the stretching vibration as a combined vibration of n-th-order vibration and 3n-th-order vibration (see Japanese Patent Laid-Open Publication No. 2007-202227).

However, it is difficult to say that sufficient sliding efficiency can be obtained by the technique described in Japanese Patent Laid-Open Publication No. 2007-202227, and hence further improvement is demanded. Further, the n-th-order vibration and the 3n-th-order vibration which are used in the technique described in Japanese Patent Laid-Open Publication No. 2007-202227 have a large difference between the respective natural frequencies of the vibrations, which causes a problem that the mechanical design (structure design) of the vibration actuator has a significant restriction (a small degree of freedom).

SUMMARY OF THE INVENTION

The present invention provides a method of driving a vibration actuator, which makes it possible to enhance the sliding efficiency of a vibration element on a driven element to thereby improve the durability, and makes it possible to reduce the restriction in the mechanical design of the vibration actuator.

In a first aspect of the invention, there is provided a method of driving a vibration actuator that includes a vibration element including an electromechanical energy conversion element, and an elastic body which is joined to the electromechanical energy conversion element, and a driven element which is brought into pressure contact with the elastic body, the method comprising exciting driving vibration in the vibration element by applying a drive signal to the electromechanical energy conversion element, to thereby move the vibration element and the driven element relative to each other, wherein the driving vibration is a combined vibration of at least n-th-order vibration and 2n-th-order vibration, n being a natural number.

In a second aspect of the invention, there is provided a vibration drive device including a vibration actuator, and a drive circuit for driving the vibration actuator, wherein the vibration actuator comprises an electromechanical energy conversion element, a vibration element including an elastic body which is joined to the electromechanical energy conversion element, and a driven element which is brought into pressure contact with the elastic body, wherein the drive circuit applies a drive signal to the electromechanical energy conversion element, for exciting driving vibration in which at least n-th-order vibration and 2n-th-order vibration are combined, n being a natural number, in the vibration element, and moves the vibration element and the driven element relative to each other by the driving vibration.

In a third aspect of the invention, there is provided a mechanical apparatus including a vibration drive device, the vibration drive device including a vibration actuator, and a drive circuit for driving the vibration actuator, wherein the vibration actuator comprises an electromechanical energy conversion element, a vibration element including an elastic body which is joined to the electromechanical energy conversion element, and a driven element which is brought into pressure contact with the elastic body, wherein the drive circuit applies a drive signal to the electromechanical energy conversion element, for exciting driving vibration in which at least n-th-order vibration and 2n-th-order vibration are combined, n being a natural number, in the vibration element, and moves the vibration element and the driven element relative to each other by the driving vibration, and wherein the vibration actuator included in the vibration drive device is used as a drive source.

According to the present invention, it is possible to suppress the occurrence of an unnecessary slip between respective contact portions of the vibration element and the driven element brought into contact, and hence it is possible to largely improve the sliding efficiency of the vibration element on the driven element, and improve the durability. Further, according to the present invention, it is possible to reduce the restriction in the mechanical design, which makes it easy to make the mechanical design of the vibration actuator according to the use.

Further features of the present invention will become apparent from the following description of exemplary embodiments (with reference to the attached drawings).

BRIEF DESCRIPTION OF THE DRAWINGS

FIG. 9 is a diagram showing test results useful in explaining a relationship between natural frequencies and the sliding efficiency of the vibration actuator appearing in FIG. 1.

FIG. 10A is a schematic perspective view of a vibration element as a component of a vibration actuator according to a second embodiment of the present invention.

FIG. 10B is a diagram useful in explaining how the vibration element is deformed by n-th-order vibration excited in the vibration element shown in FIG. 10A.

FIG. 10C is a diagram useful in explaining how the vibration element is deformed by 2n-th-order vibration excited in the vibration element shown in FIG. 10A.

DESCRIPTION OF THE EMBODIMENTS

The present invention will now be described in detail below with reference to the accompanying drawings showing embodiments thereof.

Figure 1:
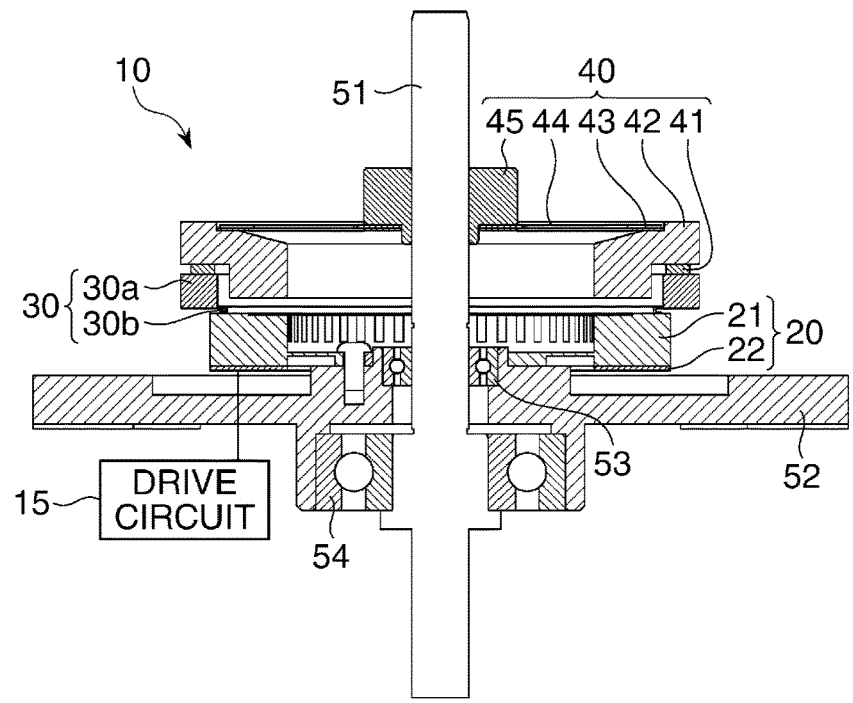
FIG. 1 is a schematic longitudinal cross-sectional view of a vibration drive device according to a first embodiment of the present invention.

FIG. 1 is a schematic longitudinal cross-sectional view of a vibration drive device according to a first embodiment of the present invention. The vibration drive device includes a vibration actuator 10 and a drive circuit 15 that drives the vibration actuator 10. The vibration actuator 10 includes a vibration element 20, a driven element 30, and a pressurizing mechanism 40, each of which is formed into an annular shape. Further, the vibration actuator 10 includes a shaft 51, a housing 52, and bearings 53 and 54.

The vibration element 20 includes a piezoelectric element 22 which is an electromechanical energy conversion element, and an elastic body 21 to which the piezoelectric element 22 is joined. The pressurizing mechanism 40 includes a vibration isolating rubber 41, a pressure spring-receiving member 42, a pressure spring-receiving rubber 43, a pressure spring 44, and a pressure spring-fixing member 45. The vibration element 20 and the driven element 30 are brought into pressure contact (friction contact) with each other by the pressurizing mechanism 40 in an axial (thrust) direction of the shaft 51, and a rotational output from the driven element 30 is taken out to the outside via the shaft 51, as described hereinafter. The driven element 30 is made of a ferrous material, such as stainless steel, and includes a body 30a and a contact spring portion 30b. The contact spring portion 30b is formed into a thickness having a spring property so as to receive a pressure force from the pressure spring 44 and be bent in a direction in which the pressure force is applied. This makes it possible to hold the driven element 30 in stable contact with the vibration element 20.

Figure 2:
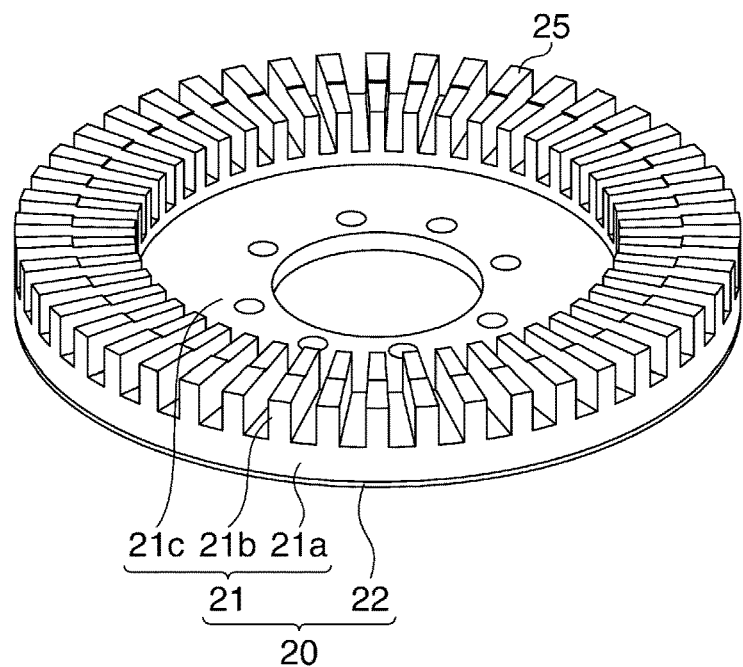
FIG. 2 is a perspective view of a vibration element as a component of a vibration actuator appearing in FIG. 1.

FIG. 2 is a perspective view of the vibration element 20 as a component of the vibration actuator 10. The elastic body 21 as a component of the vibration element 20 is made of a ferrous material, such as stainless steel, which has been subjected to nitriding treatment, and includes a base portion 21a, a plurality of protrusions 21b, and a support portion 21c. The piezoelectric element 22 is joined to one surface of the base portion 21a (surface parallel to a radial direction). The plurality of protrusions 21b for enlarging vibration displacement are formed on the other surface of the base portion 21a opposite to the one surface joined to the piezoelectric element 22, at substantially equally-spaced intervals on the same circumference, in a manner protruding from the base portion 21a in a thickness direction thereof. An extremity end surface of each protrusion 21b forms a contact portion 25 which is brought into pressure contact with the contact spring portion 30b. The elastic body 21 is secured to the housing 52 including the bearings 53 and 54 by the support portion 21c which extends radially inward from the base portion 21a.

Figure 3A:
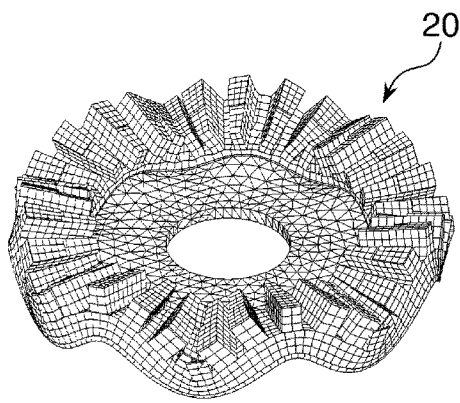
FIG. 3A is a diagram useful in explaining how the vibration element is deformed by n-th-order vibration excited in the vibration element, shown in FIG. 2.
Figure 3B:
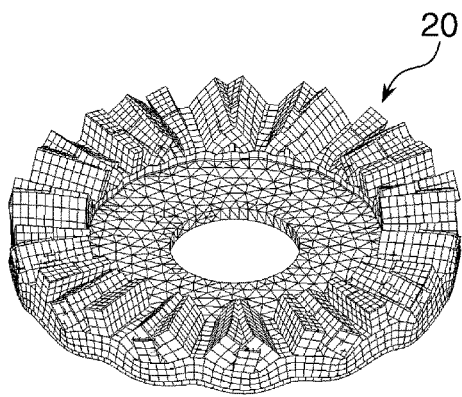
FIG. 3B is a diagram useful in explaining how the vibration element is deformed by 2n-th-order vibration excited in the vibration element shown in FIG. 2.

FIG. 3A is a diagram useful in explaining how the vibration element 20 is deformed by n-th-order vibration (n is an integer of not smaller than 1) excited in the vibration element 20, and FIG. 3B is a diagram useful in explaining how the vibration element 20 is deformed by 2n-th-order vibration excited in the vibration element 20. Note that in FIGS. 3A and 3B, to make it easy to recognize the vibration displacement generated in the vibration element 20, deformation (displacement) of the vibration element 20 is illustrated by enlarging (exaggerating) the actual deformation. Further, although FIGS. 3A and 3B each show the vibration displacement generated in the case of n=7, the value of n may be set to any number insofar as it is a natural number of not smaller than 1.

The drive circuit 15 applies a drive signal (alternating voltage) to the piezoelectric element 22 to thereby excite a driving vibration in which the n-th-order vibration and the 2n-th-order vibration, set in advance, are combined, in the vibration element 20 as a traveling wave. The n-th-order vibration and the 2n-th-order vibration refer to bending vibrations of which the numbers of waves along the circumference of the base portion 21a are n and 2n, respectively. The contact portions 25 of the vibration element 20 are caused to perform elliptical motion by the driving vibration excited in the vibration element 20, whereby the driven element 30 is frictionally driven by the contact portions 25. The direction of driving the driven element 30 is the circumferential direction of the vibration element 20 configured to have an annular shape, and the rotational output from the driven element 30 is output to the outside via the pressurizing mechanism 40 and the shaft 51.

Figure 4:
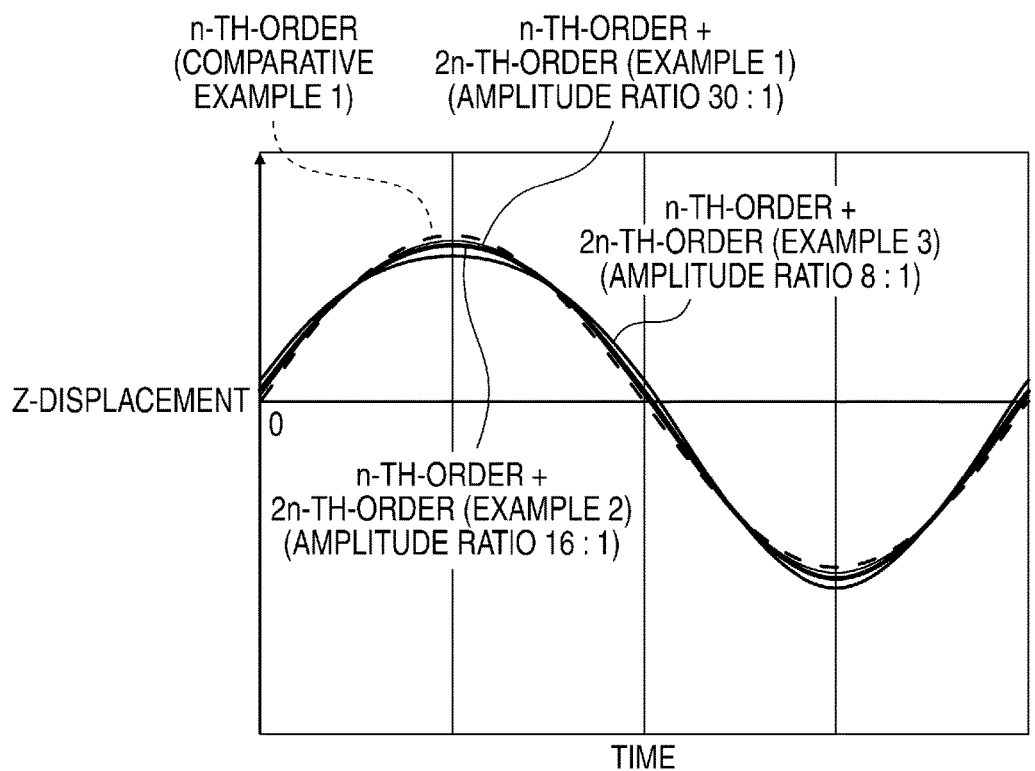
FIG. 4 is a diagram useful in explaining vibration displacement of each of driving vibrations in Comparative example 1 and Examples 1 to 3, which are excited in the vibration element shown in FIG. 2.

FIG. 4 is a diagram useful in explaining the vibration displacement of each of driving vibrations in Comparative example 1 and Examples 1 to 3, which are excited in the vibration element 20. The horizontal axis of the graph shown in FIG. 4 represents time, and the vertical axis represents Z-displacement (displacement of bending deformation as the driving vibration in an out-of-plane direction). In the illustrated example, vibration in which the n-th-order vibration and the 2n-th-order vibration, shifted in phase from each other by 90 degrees, are combined, is taken as the driving vibration excited in the vibration element 20. The phase, mentioned here, refers to each of values of $\theta_n$ and $\theta_{2n}$ in the amplitude Z of the combined vibration of the n-th-order vibration and the 2n-th-order vibration: $Z = A_n \sin(\omega_n t + \theta_n) + A_{2n} \sin(2\omega_n t + \theta_{2n})$, and "shifted in phase from each other by 90 degrees" means that $\theta_n - \theta_{2n} = 90$, wherein $A_n$ represents the amplitude of the n-th order vibration component, $\theta_n$ the phase thereof, and $\omega_n$ the frequency thereof, and $A_{2n}$ represents the amplitude of the 2n-th order vibration component, and $\theta_{2n}$ the phase thereof.

Referring to FIG. 4, "n-th-order (Comparative Example 1)" indicated by a broken line represents the vibration displacement of the sine wave-like driving vibration according to the prior art. On the other hand, "n-th-order+2n-th-order (Examples 1, 2, and 3)" each indicated by a solid line represent the vibration displacement of the driving vibration in the present embodiment, and ratios between displacement of the n-th-order vibration and displacement of the 2n-th-order vibration (amplitude ratio) in Examples 1, 2, and 3 are approximately 30:1, approximately 16:1, and approximately 8:1, respectively. The driving vibrations in Examples 1, 2, and 3 each are asymmetric in the vibration displacement (Z-displacement) between a plus (+) side and a minus (−) side, and each have an absolute value of the vibration displacement on the plus side smaller than an absolute value of the vibration displacement on the minus side.

Figure 5:
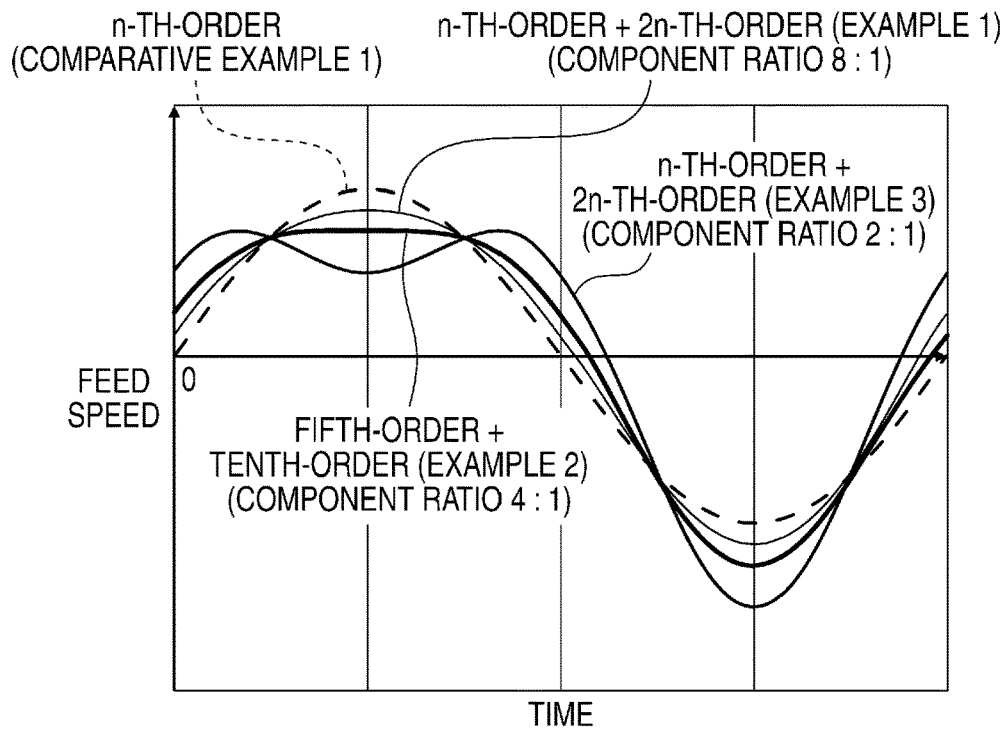
FIG. 5 is a diagram useful in explaining a feed speed of contact portions of the vibration element caused by each of the driving vibrations in Comparative example 1 and Examples 1 to 3, shown in FIG. 4.

FIG. 5 is a diagram useful in explaining a feed speed of the contact portions 25 of the vibration element caused by each of the driving vibrations in Comparative example 1 and Examples 1 to 3. The feed speed is a speed of elliptical motion generated at each contact portion 25, which takes a plus (+) value in a case where the contact portion 25 performs the elliptical motion in the same direction as the direction of driving the driven element 30, and a minus (−) value in a case where the contact portions 25 perform the elliptical motion in an opposite direction to the direction of driving the driven element 30.

An "n-th-order" feed speed in Comparative Example 1, indicated by a broken line, corresponds to the driving vibration in Comparative Example 1, appearing in FIG. 4. Further, "n-th-order+2n-th-order" feed speeds in Examples 1, 2 and 3, indicated by solid lines, correspond to the driving vibrations in Examples 1, 2 and 3, appearing in FIG. 4. The component ratio between the n-th-order vibration and the 2n-th-order vibration at the respective feed speeds in Examples 1, 2, and 3 is approximately 8:1, approximately 4:1, and approximately 2:1. In Examples 1, 2, and 3, the feed speeds are asymmetric between the plus side and the minus side, and the maximum value of the absolute value of the feed speed on the plus side is smaller than the maximum value of the absolute value of the feed speed on the minus side.

Next, a description will be given of driving patterns of the driven element 30 driven by the driving vibrations in Examples 1 to 3, excited in the vibration element 20. As described above, the driven element 30 is brought into pressure contact with the contact portions 25 (upper surfaces of the protrusions 21b) on the plus side of the vibration displacement, shown in FIG. 4, via the contact spring portion 30b thereof. Therefore, the contact spring portion 30b is deformed in a manner following the bending deformation of the vibration element 20, and has a limited contact region with respect to the vibration element 20 on the plus side of vibration displacement.

Figure 6:
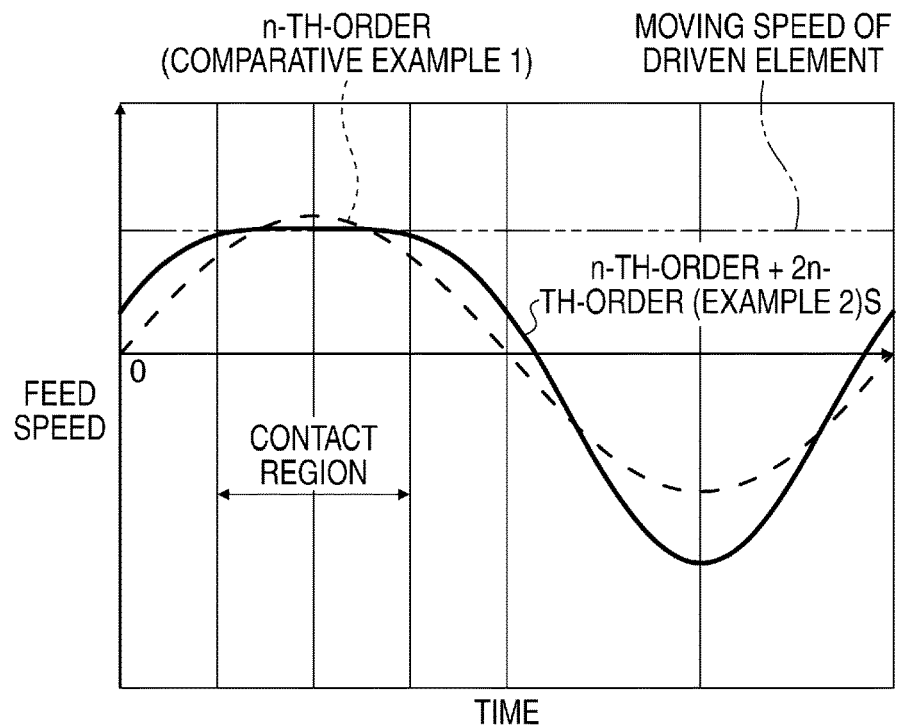
FIG. 6 is a diagram showing a first example of a relationship between the feed speed of the contact portions of the vibration element, shown in FIG. 2, and a moving speed of a driven element.

FIG. 6 is a diagram showing a first example of the relationship between the feed speed of each contact portion 25 and the moving speed (rotational speed) of the driven element 30. An "n-th-order" feed speed in Comparative Example 1, indicated by a broken line, corresponds to Comparative Example 1 appearing in FIG. 5, and an "n-th-order+2n-th-order" feed speed in Example 2, indicated by a solid line, corresponds to Example 2, appearing in FIG. 5. The component ratio between the n-th-order vibration and the 2n-th-order vibration at the feed speed in Example 2 is approximately 4:1. The contact region of the driven element 30 with respect to the vibration element 20 is not limited, but the following description is given assuming that it is set to ¼ of one wave length of the driving vibration. The "moving speed of the driven element" indicated by a two-dot chain line represents the moving speed of the driven element 30.

In the case of Comparative Example 1, the feed speed of each contact portion 25 has sine wave-like distribution, and hence in the contact region between the vibration element 20 and the driven element 30, a slip occurs between the vibration element 20 and the driven element 30 in a range of the speed which is different from the moving speed of the driven element 30 (two-dot chain line in FIG. 6). This unnecessary slip lowers the sliding efficiency of the vibration actuator 10, and further, lowers the durability due to the wear of the frictional sliding surface. Further, there is a fear that the unnecessary slip makes the rotational driving of the driven element 30 unstable, produces unusual noises, or causes other like problems.

In the case of Example 2, the feed speed of each contact portion 25 has an approximately uniform distribution at a wave head and its vicinity on the plus side. Further, the moving speed of the driven element 30 is substantially equal to the feed speed of the contact portion 25 in the contact region. Therefore, in the case of Example 2, occurrence of an unnecessary slip in the contact region between the vibration element 20 and the driven element 30 is suppressed. This makes it possible to reduce sliding loss, and enhance the sliding efficiency of the vibration actuator 10 to thereby improve the durability. Further, it is possible to stabilize the rotational driving of the driven element, and further, it is possible to suppress the occurrence of unusual noises.

Note that, as shown in FIG. 5, Example 1 is not so uniform in the feed speed of the contact portion 25 at the wave head and its vicinity as in Example 2, but is higher in uniformity than Comparative Example 1. Therefore, Example 1 can provide the effect of suppressing the occurrence of an unnecessary slip more than Comparative Example 1, even though the effect is smaller than that provided by Example 2.

Figure 7:
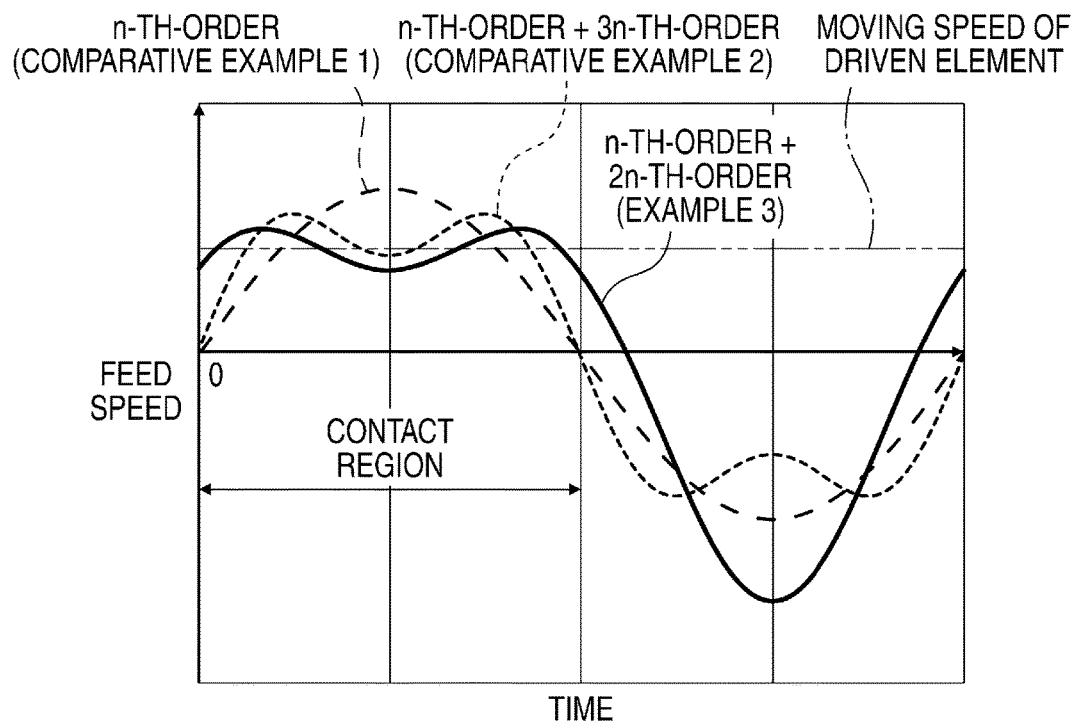
FIG. 7 is a diagram showing a second example of the relationship between the feed speed of the contact portions of the vibration element, shown in FIG. 2, and the moving speed of the driven element.

FIG. 7 is a diagram showing a second example of the relationship between the feed speed of each contact portion 25 and the moving speed (rotational speed) of the driven element 30. An "n-th-order" feed speed in Comparative Example 1, indicated by a broken line, corresponds to Comparative Example 1 appearing in FIG. 5, and an "n-th-order+3n-th-order" feed speed in Comparative Example 2 is another example of the prior art. An "n-th-order+2n-th-order" feed speed in Example 3, indicated by a solid line, corresponds to Example 3, appearing in FIG. 5. A "moving speed of the driven element" indicated by a two-dot chain line represents the moving speed of the driven element 30. The component ratio between the n-th-order vibration and the 3n-th-order vibration at the feed speed in Comparative Example 2 is approximately 3:1. As described with reference to FIG. 5, the component ratio between the n-th-order vibration and the 2n-th-order vibration at the feed speed in Example 3 is approximately 2:1. The contact region of the driven element 30 with respect to the vibration element 20 is not limited, but the following description is given assuming that it is set to ½ of one wave length of the driving vibration.

In Comparative Examples 1 and 2, a slip occurs between the vibration element 20 and the driven element 30 in a range of the speed different from the moving speed of the driven element 30 in the contact region between the vibration element 20 and the driven element 30. This unnecessary slip lowers the sliding efficiency of the vibration actuator 10, and further, lowers the durability due to the wear of the frictional sliding surface. Further, there is a fear that the unnecessary slip makes the rotational driving of the driven element 30 unstable, produces unusual noises, or causes other like problems.

On the other hand, the feed speed of each contact portion 25 in Example 3 has a smaller distribution width of the feed speed in the vicinity of the wave head on the plus side than in Comparative Examples 1 and 2. Therefore, in Example 3, the occurrence of an unnecessary slip is suppressed in the contact region between the vibration element 20 and the driven element 30, compared with the Comparative Examples 1 and 2. This makes it possible to reduce sliding loss, and enhance the sliding efficiency of the vibration actuator 10 to thereby improve the durability. Further, it is possible to stabilize the rotational driving of the driven element 30, and further, it is possible to suppress the occurrence of unusual noises.

As described above, in the present embodiment, the absolute value of the maximum value of the feed speed of each contact portion 25 of the vibration element 20 in the same direction as the direction of driving the driven element 30 is smaller than the absolute value of the maximum value of the feed speed of each contact portion 25 in an opposite direction to the direction of driving the driven element 30. When this condition is satisfied, it is possible to suppress the occurrence of an unnecessary slip in the contact region between the vibration element 20 and the driven element 30. Note that it is possible to obtain the maximum sliding efficiency when the component ratio between the n-th-order vibration and the 2n-th-order vibration at the feed speed is approximately 4:1.

Next, a description will be given of a method of exciting the driving vibrations of the above-described Examples 1 to 3 in the vibration element 20. The frequency (driving frequency) of a drive signal applied to the piezoelectric element 22 by the drive circuit 15 mainly has a component of $f_{OP}$ [kHz], and the n-th-order vibration is excited in the vibration element 20 by this drive signal. At this time, the 2n-th-order vibration is excited in the vibration element 20 by a reaction force from the driven element 30. Then, by changing the driving frequency $f_{OP}$ within a driving frequency range (the minimum value $f_{min}$ [kHz], the maximum value $f_{max}$ [kHz]), set in advance, it is possible to change the moving speed of the driven element 30.

Figure 8:
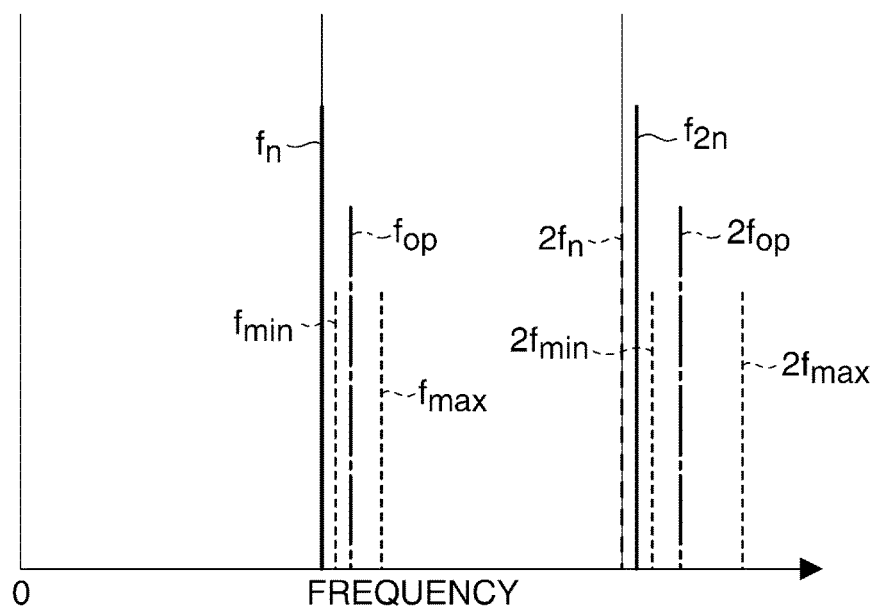
FIG. 8 is a diagram showing a relationship between various frequencies and natural frequencies associated with the driving of the vibration actuator appearing in FIG. 1.

FIG. 8 is a diagram showing a relationship between various frequencies and natural frequencies associated with the driving of the vibration actuator 10. Assuming that the natural frequency of the n-th-order vibration, shown in FIG. 3A, is $f_n$ [kHz], and the natural frequency of the 2n-th-order vibration, shown in FIG. 3B, is $f_{2n}$ [kHz], it is found that $f_{2n}$ is approximately equal to two times $f_n$ ($2f_n$). In this case, compared with the prior art using the n-th-order vibration and the 3n-th-order vibration, a difference between the natural frequencies is small, and hence there is an advantage that restriction on the mechanical design (structure design) of the vibration actuator 10 is reduced (degree of freedom in the mechanical design is increased).

When the driving frequency $f_{OP}$ is varied toward the low-frequency side from $f_{max}$ to $f_{min}$, due to the natural frequency of the n-th-order vibration and the natural frequency of the 2n-th-order vibration, the components of the n-th-order vibration and the 2n-th-order vibration in the vibration displacement and the feed speed are both increased, whereby the moving speed of the driven element 30 is increased. The maximum value $f_{max}$ is approximately 1.1 to 1.2 times of $f_n$, and the minimum value $f_{min}$ is a value between $f_n$ and $f_{max}$. Note that $f_{2n}$ is required to be not larger than approximately 2.2 to 2.4 times of $f_n$.

The configuration that is capable of suppressing the occurrence of an unnecessary slip between the vibration element 20 and the driven element 30 is not limited to the above-described configuration. For example, a state in which the driving vibration is a combined vibration of the n-th-order vibration and the 2n-th-order vibration is not required to be generated in all the driving frequency range but is only required to be generated in part of the driving frequency range. Further, it is not required to cause a state, in which both the components of the n-th-order vibration and the 2n-th-order vibration at the feed speed of the contact portions 25 increase as the driving frequency $f_{OP}$ becomes smaller, to occur in all of the driving frequency range, but is only required to cause the state to occur in part of the driving frequency range. Further, it is not required to cause the contact state between the vibration element 20 and the driven element 30 in each of the above-described Examples 1 to 3 to occur in all of the driving frequency range, but is only required to cause the state to occur in part of the driving frequency range.

Although in the present embodiment, the description is given of the driving vibration in which the n-th-order vibration and the 2n-th-order vibration having a phase difference of 90 degrees are combined, this is not limitative. For example, the phase difference between the n-th-order vibration and the 2n-th-order vibration is not particularly limited, insofar as the driving vibration can be combined in which the absolute value of the maximum value of the feed speed of each contact portion 25 in the same direction as the direction of driving the driven element 30 is smaller than the absolute value of the maximum value of the feed speed of the contact portion 25 in an opposite direction to the direction of driving the driven element 30.

To obtain the advantageous effects provided by the present invention in a wide driving frequency range, it is desirable that the natural frequency $f_{2n}$ is approximately equal to twice the natural frequency $f_n$. FIG. 9 is a diagram showing test results useful in explaining a relationship between the natural frequencies $f_{2n}$ and $f_n$, and the sliding efficiency of the vibration actuator 10. Measurement of the natural frequencies $f_n$ and $f_{2n}$ of the vibration element 20 is performed in a state in which the vibration element 20 is not in pressure contact with the driven element 30. In the test, the vibration actuator 10 is used, and the sliding efficiency is evaluated based on the driving stability of the vibration actuator 10. Note that the driving stability of the vibration actuator 10 means that the vibration actuator 10 is free from abnormalities, including a start failure of the vibration actuator 10, lowering of the rotational efficiency of the driven element 30, occurrence of unusual noises, and occurrence of abnormal wear of the frictional sliding surfaces of the vibration element 20 and the driven element 30.

The best result (indicated by a circle in FIG. 9: no abnormality) is obtained when the natural frequency $f_{2n}$ is approximately equal to 2.00 to 2.15 times of the natural frequency $f_n$, and a relatively good result (indicated by a triangle in FIG. 9) is obtained when the natural frequency $f_{2n}$ is approximately equal to 1.85 to 2.30 times of the natural frequency $f_n$. However, when the natural frequency $f_{2n}$ is out of the range from 1.85 to 2.30 times of the natural frequency $f_n$, at least one abnormality has remarkably occurred (indicated by a cross in FIG. 9). However, the sliding efficiency varies with the responsiveness of the n-th-order vibration and the 2n-th-order vibration of the vibration actuator 10, the magnitude of the pressure force and the contact state between the vibration element 20 and the driven element 30, and so forth. Therefore, the value of $f_{2n}/f_n$ being in a range of 1.85 to 2.30 is a guide to obtain the advantageous effects provided by the present invention, but it is not strictly limited to a value within this range.

To control the component ratio between the n-th-order vibration and the 2n-th-order vibration at the feed speed generated in each contact portion 25 of the vibration element 20, the magnitude of the second harmonic component of the drive signal may be controlled. Further, although the driving vibration is excited in the vibration element 20 using the n-th-order natural frequency and the 2n-th-order natural frequency, this is not limitative, but only the n-th-order natural frequency may be used without using the 2n-th-order natural frequency. That is, the 2n-th-order vibration may be excited using the second harmonic component of the drive signal as forced vibration.

Next, a description will be given of a second embodiment of the present invention. FIG. 10A is a schematic perspective view of a vibration element 60 as a component of a disc-shaped vibration actuator according to the second embodiment. The vibration element 60 is equivalent to a vibration element as a component of a disc-shaped ultrasonic motor, disclosed in Japanese Patent No. 3001956.

The vibration element 60 includes an elastic body 61 formed by a disc-shaped base portion 61a and a plurality of protrusions 61b which are formed on an upper surface of the base portion 61a. The plurality of protrusions 61b are arranged at substantially equally-spaced intervals on the same circumference, and a piezoelectric element, not shown, is joined to a lower surface of the base portion 61a opposite to the upper surface on which the protrusions 61b are formed, using an adhesive or the like.

By applying a drive signal from a drive circuit having a configuration equivalent to that of the drive circuit 15 described in the first embodiment, to the piezoelectric element, the driving vibration (traveling wave) in which the n-th-order vibration and the 2n-th-order vibration, set in advance, are combined is excited in the vibration element 60. FIG. 10B is a diagram useful in explaining how the vibration element 60 is deformed by the n-th-order vibration excited in the vibration element 60, and FIG. 10C is a diagram useful in explaining how the vibration element 60 is deformed by the 2n-th-order vibration excited in the vibration element 60. Note that in FIGS. 10B and 10C, to make it easy to recognize the vibration displacement generated in the vibration element 60, deformation (displacement) of the vibration element 60 is illustrated by enlarging (exaggerating) the actual deformation. Further, although FIGS. 10B and 10C each show the vibration displacement generated in the case of n=3, the value of n may be set to any number insofar as it is a natural number of not smaller than 1.

The n-th-order vibration and the 2n-th-order vibration are bending vibrations of which the numbers of waves along the circumference of the base portion 61a are 2 and 2n, respectively. The driving vibration excited in the vibration element 60 has nodes in a radial direction of the vibration element 60, and the n-th-order vibration and the 2n-th-order vibration are equal in the number of waves in the radial direction. The driving vibration in which the n-th-order vibration and the 2n-th-order vibration, excited in the vibration element 60, are combined, causes each of the contact portions 25 on the upper surfaces of the protrusions 61b to perform elliptical motion. The driven element, not shown, which has e.g. an annular shape or a disc-like shape, is in pressure contact with contact portions 65 of the vibration element 60 in a direction in which the protrusions 61b protrude, and is rotated in the same direction as the circumferential direction of the vibration element 60 by being frictionally driven by the contact portions 65.

Similar to the first embodiment, in the present embodiment as well, by using the driving vibration in which the n-th-order vibration and the 2n-th-order vibration are combined, it is possible to suppress the occurrence of an unnecessary slip between the vibration element 60 and the driven element. This makes it possible to reduce sliding loss, enhance the sliding efficiency of the vibration actuator, and improve the durability. Further, it is possible to stabilize the rotational driving of the driven element, and further, it is possible to suppress the occurrence of unusual noises.

Figure 11A:
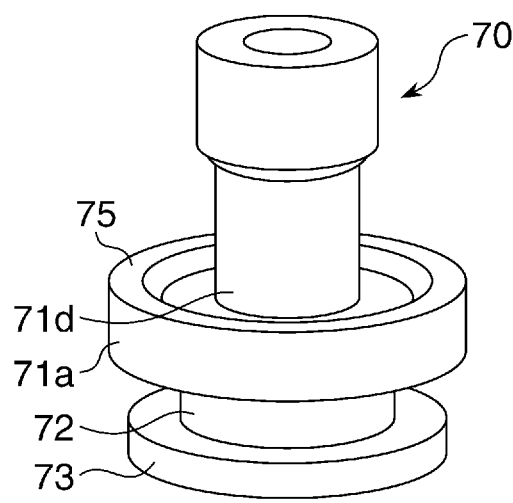
FIG. 11A is a schematic perspective view of a vibration element as a component of a vibration actuator according to a third embodiment of the present invention.

Next, a description will be given of a third embodiment of the present invention. FIG. 11A is a schematic perspective view of a vibration element 70 as a component of a rod-shaped vibration actuator according to the third embodiment. The vibration element 70 is equivalent to a vibration element as a component of a vibration wave drive device disclosed in Japanese Patent No. 4829495.

The vibration element 70 includes a first elastic body 71d, a disc-shaped elastic body 71a, a piezoelectric element 72, and a second elastic body 73, each of which has an annular shape. The first elastic body 71d is fitted on an outer periphery of a shaft, not shown, and is positioned in an axial (thrust) direction of the shaft. Further, the shaft extends through the inside of the disc-shaped elastic body 71a and the piezoelectric element 72, and the second elastic body 73 is screwed to one end of the shaft. With this configuration, a flexible circuit board, not shown, that supplies a drive signal to the piezoelectric element 72, the piezoelectric element 72, and the disc-shaped elastic body 71a are sandwiched and held between the first elastic body 71d and the second elastic body 73 in the axial (thrust) direction of the first elastic body 71d.

By applying a drive signal from a drive circuit having a configuration equivalent to that of the drive circuit 15 described in the first embodiment, to the piezoelectric element 72, the driving vibration (traveling wave) in which the n-th-order vibration and the 2n-th-order vibration, set in advance, are combined is excited in the vibration element 70.

Figure 11B:
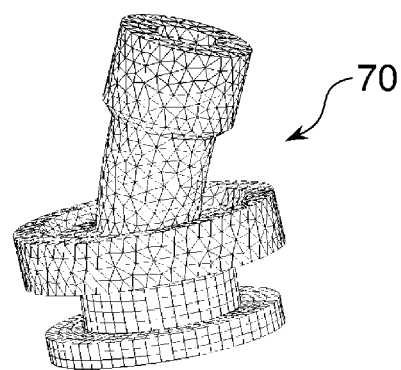
FIG. 11B is a diagram useful in explaining how the vibration element is deformed by n-th-order vibration excited in the vibration element shown in FIG. 11A.
Figure 11C:
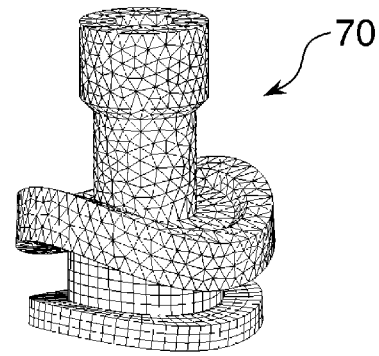
FIG. 11C is a diagram useful in explaining how the vibration element is deformed by 2n-th-order vibration excited in the vibration element, shown in FIG. 11A.

FIG. 11B is a diagram useful in explaining how the vibration element 70 is deformed by the n-th-order vibration excited in the vibration element 70, and FIG. 11C is a diagram useful in explaining how the vibration element 70 is deformed by the 2n-th-order vibration excited in the vibration element 70. Note that in FIGS. 11B and 11C, to make it easy to recognize the vibration displacement generated in the vibration element 70, deformation (displacement) of the vibration element 70 is illustrated by enlarging (exaggerating) the actual deformation. Further, although FIGS. 11B and 11C each show the vibration displacement generated in the case of n=1, the value of n may be set to any number insofar as it is a natural number of not smaller than 1.

The n-th-order vibration and the 2n-th-order vibration are bending vibrations of which the numbers of waves along the circumference of the disc-shaped elastic body 71a are 2 and 2n, respectively. The first-order (n=1) vibration excited in the vibration element 70 deforms the disc-shaped elastic body 71a such that the node is formed in the circumferential direction and the whole disc-shaped elastic body 71a is fallen. The driving vibration in which the n-th-order vibration and the 2n-th-order vibration are combined, which is excited in the vibration element 70, causes a contact portion 75 which is an outer peripheral portion of the upper surface of the disc-shaped elastic body 71a to perform elliptical motion. The driven element, not shown, having, e.g., an annular shape or a disc-like shape is rotatably arranged around the shaft in a manner surrounding the shaft, and is in pressure contact with the contact portion 75 of the vibration element 70. Therefore, the driven element is rotated in the same direction as the circumferential direction of the vibration element 70 (rotated about the shaft) by being frictionally driven by the contact portion 75.

Similar to the first embodiment, in the present embodiment as well, by using the driving vibration in which the n-th-order vibration and the 2n-th-order vibration are combined, it is possible to suppress the occurrence of an unnecessary slip between the vibration element 70 and the driven element. This makes it possible to reduce sliding loss, enhance the sliding efficiency of the vibration actuator, and improve the durability. Further, it is possible to stabilize the rotational driving of the driven element, and further suppress the occurrence of unusual noises.

Figure 12A:
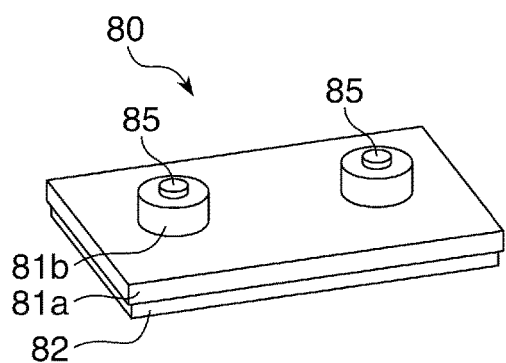
FIG. 12A is a schematic perspective view of a vibration element as a component of a vibration actuator according to a fourth embodiment of the present invention.

Next, a description will be given of a fourth embodiment of the present invention. FIG. 12A is a schematic perspective view of a vibration element 80 as a component of a vibration actuator according to a fourth embodiment. The vibration element 80 is equivalent to a vibration element as a component of a vibration drive device disclosed in Japanese Patent No. 4261964.

The vibration element 80 includes a plate-shaped elastic body 81a, two protrusions 81b formed on one surface of the elastic body 81a with a predetermined spacing therebetween, and a piezoelectric element 82 which is joined to the other surface of the elastic body 81a opposite to the one surface on which the protrusions 81b are formed. A driven element, not shown, is in pressure contact with contact portions 85 as extremity end surfaces of the protrusions 81b in a direction in which the protrusions 81b protrude.

Figure 12B:
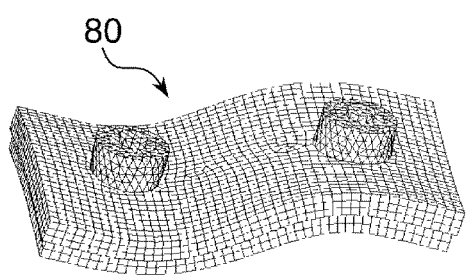
FIG. 12B is a diagram useful in explaining how the vibration element is deformed by n-th-order vibration in a first vibration mode excited in the vibration element shown in FIG. 12A.
Figure 12C:
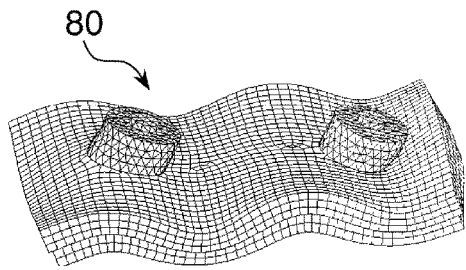
FIG. 12C is a diagram useful in explaining how the vibration element is deformed by 2n-th-order vibration in the first vibration mode excited in the vibration element shown in FIG. 12A.
Figure 12D:
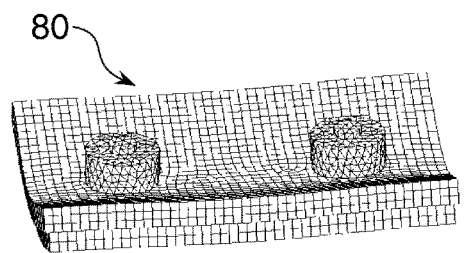
FIG. 12D is a diagram useful in explaining how the vibration element is deformed by vibration in a second vibration mode excited in the vibration element shown in FIG. 12A.

By applying a drive signal from a drive circuit having a configuration equivalent to that of the drive circuit 15 described in the first embodiment, to the piezoelectric element 82, the driving vibration in which the n-th-order vibration and the 2n-th-order vibration, set in advance, are combined is excited in the vibration element 80. FIG. 12B is a diagram useful in explaining how the vibration element 80 is deformed by the n-th-order vibration in a first vibration mode excited in the vibration element 80, and FIG. 12C is a diagram useful in explaining how the vibration element 80 is deformed by the 2n-th-order vibration in the first vibration mode excited in the vibration element 80. FIG. 12D is a diagram useful in explaining how the vibration element 80 is deformed by vibration in a second vibration mode excited in the vibration element 80. Note that in FIGS. 12B to 12D, to make it easy to recognize the vibration displacement generated in the vibration element 80, deformation (displacement) of the vibration element 80 is illustrated by enlarging (exaggerating) the actual deformation. Further, although FIGS. 12B and 12C each show the vibration displacement generated in the case of n=2, the value of n may be set to any number insofar as it is a natural number of not smaller than 1.

The n-th-order vibration and the 2n-th-order vibration in the first vibration mode are bending vibrations that form, in the elastic body 81a, n antinodes of vibration and 2n antinodes of vibration, respectively, in a direction connecting the two protrusions 81b. By applying a drive signal to the piezoelectric element 82 joined to the elastic body 81a, a standing wave of vibration in which the n-th-order vibration and the 2n-th-order vibration in the first vibration mode, set in advance, and vibration in the second vibration mode are combined is excited in the vibration element 80, as the driving vibration. This driving vibration causes the contact portions 85 to perform elliptical motion within a plane including the direction connecting the two protrusions 81b and the direction in which the protrusions 81b protrude. The driven element, not shown, is in pressure contact with the contact portions 85 of the vibration element 80, and hence the driven element is frictionally driven by the contact portions 85, and is linearly driven in the direction connecting the two protrusions 81*b*.

Note that the plurality of vibration elements 80 are arranged on an annular base material such that a line connecting the two protrusions 81*b* of one vibration element 80 becomes a tangential line on the same circumference. Then, the annular (or disc-shaped) driven element is brought into pressure contact with the contact portions 85 such that the driven element is coaxial with the base material, whereby it is possible to rotationally move the driven element and the base material relative to each other in the circumferential direction.

Similar to the first embodiment, in the present embodiment as well, by using the driving vibration in which the n-th-order vibration and the 2n-th-order vibration are combined, it is possible to suppress the occurrence of an unnecessary slip between the vibration element 80 and the driven element. This makes it possible to reduce sliding loss, enhance the sliding efficiency of the vibration actuator, and improve the durability. Further, it is possible to stabilize the linear driving or rotational driving of the driven element, and further suppress the occurrence of unusual noises.

Next, a description will be given of fifth to eighth embodiments of the present invention. In the fifth to eighth embodiments, one of the above-described vibration actuators is applied to a robot, an image forming apparatus, an image pickup apparatus, or an automatic stage, as a drive source, respectively.

Figure 13:
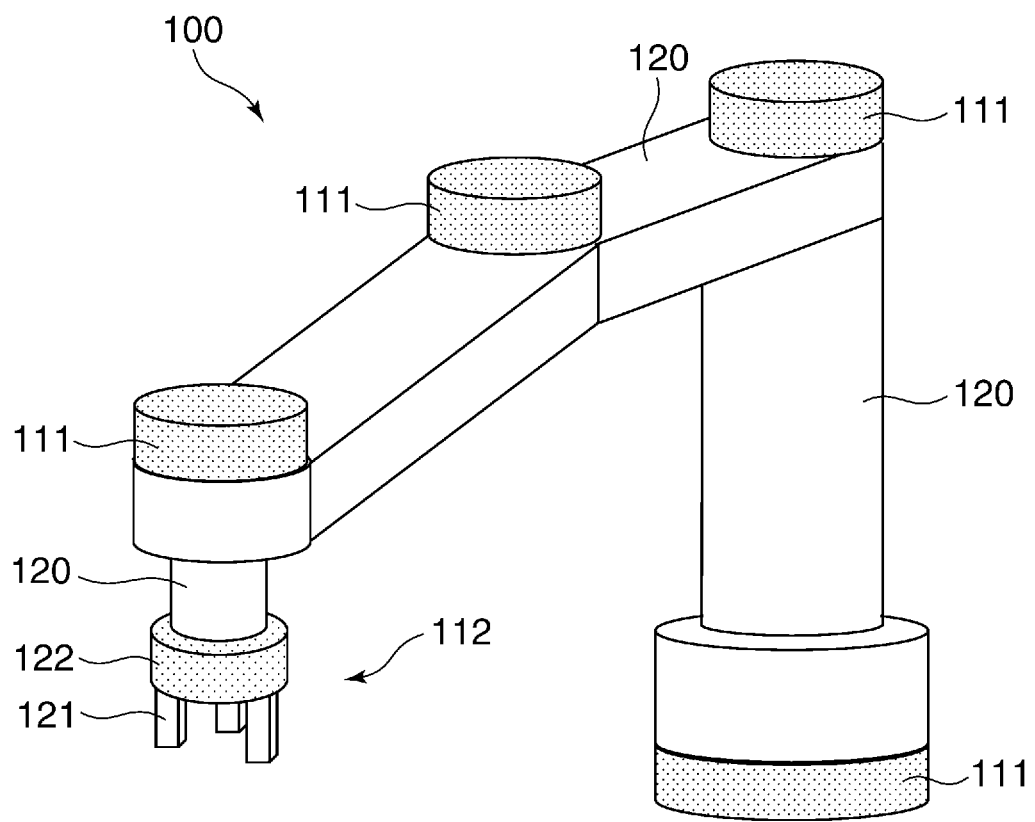
FIG. 13 is a schematic perspective view of a robot equipped with the vibration actuator according to the embodiments of the present invention.

The fifth embodiment is an example in which the vibration actuator 10 described in the first embodiment is applied to the robot. FIG. 13 is a schematic perspective view of the robot, denoted by reference numeral 100, which is equipped with the vibration actuator 10, and shows a horizontal multi-joint robot which is a type of industrial robots, by way of example.

The robot 100 includes a hand section 112 provided on a distal end thereof, a plurality of arms 120, and arm joint sections 111 each of which connects between associated ones of the arms 120 or is provided on an end of an associated one of the arms 120. The vibration actuator 10 is disposed in each arm joint section 111, for changing an angle at which the two arms 120 intersect each other, or rotating each arm 120 about a thrust axis thereof. The hand section 112 includes the arm 120, a holding section 121 which is disposed at a distal end of the arm 120, and a hand joint section 122 that connects the arm 120 and the holding section 121. The vibration actuator 10 is disposed in the hand joint section 122, for driving the holding section 121 for rotation. Note that the vibration actuator 10 is driven by the drive circuit 15, and the method of driving the vibration actuator 10 has already been described in the first embodiment, and hence description thereof is omitted.

Figure 14:
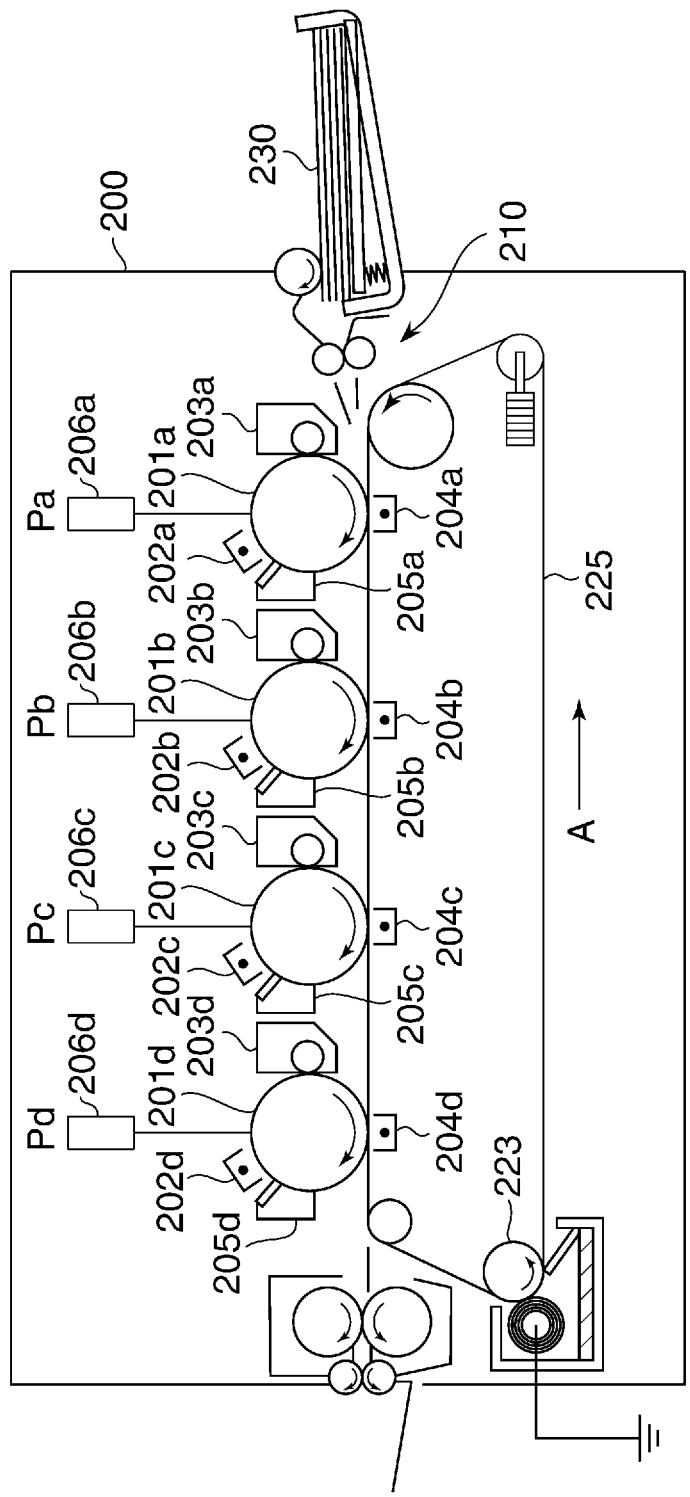
FIG. 14 is a side cross-sectional view of internal configuration of a color image forming apparatus equipped with the vibration actuator according to the embodiments of the present invention.

The sixth embodiment is an example in which the vibration actuator 10 described in the first embodiment is applied to the image forming apparatus. FIG. 14 is a schematic side cross-sectional view of a color image forming apparatus 200 as an example of the image forming apparatus equipped with the vibration actuator.

The color image forming apparatus 200 includes four image forming units Pa, Pb, Pc, and Pd, but the number of image forming units is not limited to four. The image forming units Pa to Pd each have substantially the same configuration and include photosensitive drums 201*a*, 201*b*, 201*c*, and 201*d*, respectively, which are image bearing members driven for rotation. Chargers 202*a*, 202*b*, 202*c*, and 202*d* for uniformly charging the photosensitive drums 201*a*, 201*b*, 201*c*, and 201*d*, developers 203*a*, 203*b*, 203*c*, and 203*d*, chargers 204*a*, 204*b*, 204*c*, and 204*d*, and cleaners 205*a*, 205*b*, 205*c*, and 205*d* are sequentially arranged around the photosensitive drums 201*a* to 201*d*, in a direction of rotation of the photosensitive drums 201*a* to 201*d*, respectively. The developers 203*a* to 203*d* each develop an electrostatic latent image formed on a drum surface of an associated one of the photosensitive drums 201*a* to 201*d*. The chargers 204*a* to 204*d* are each used for transferring a developed toner image onto a transfer material 230. The cleaners 205*a* to 205*d* remove toner remaining on the photosensitive drums 201*a* to 201*d*, respectively. Exposure devices 206*a*, 206*b*, 206*c*, and 206*d* are arranged above the photosensitive drums 201*a* to 201*d*, respectively.

A conveying belt 225 arranged in a manner brought into contact with the photosensitive drums 201*a* to 201*d* carries thereon the transfer material 230 delivered through a feeding unit 210, and is driven by a drive roller 223 for rotation in a direction indicated by an arrow A in FIG. 14. The conveying belt 225 and the drive roller 223 form a conveying unit configured to sequentially convey the transfer material 230 to the image forming units Pa to Pd. The vibration actuator 10 is used as a drive motor for rotating the photosensitive drums 201*a* to 201*d*, and is also used as a drive motor for rotating the drive roller 223 for driving the conveying belt 225. Note that the method of driving the vibration actuator 10 has already been described in the first embodiment, and hence description thereof is omitted.

Figure 15A:
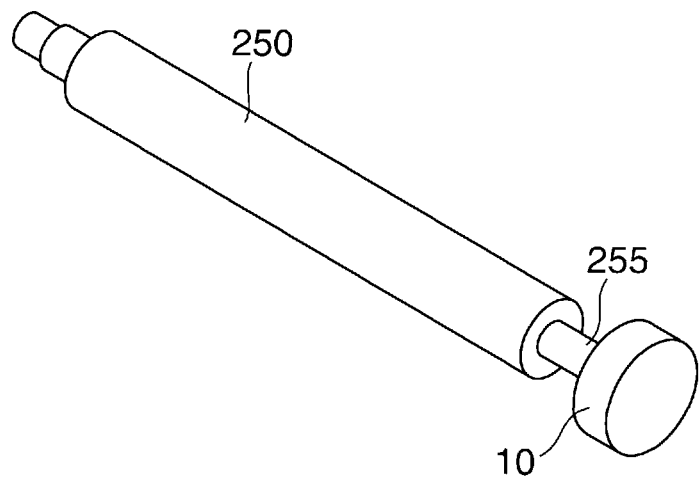
FIG. 15A is a schematic perspective view of a photosensitive drum as a component of the color image forming apparatus shown in FIG. 14, which is equipped with the vibration actuator as a drive motor.

FIG. 15A is a schematic perspective view of a photosensitive drum as a component of the color image forming apparatus shown in FIG. 14, which is equipped with the vibration actuator 10 as a drive motor. For example, the vibration actuator 10 can be directly connected to a drive shaft 255 of the photosensitive drum, denoted by reference numeral 250 (which corresponds to each of the photosensitive drums 201*a* to 201*d*). This eliminates the need of using a speed reduction unit, such as a gear, which has been conventionally required, and hence it is possible to reduce color shift and thereby improve print quality.

Figure 15B:
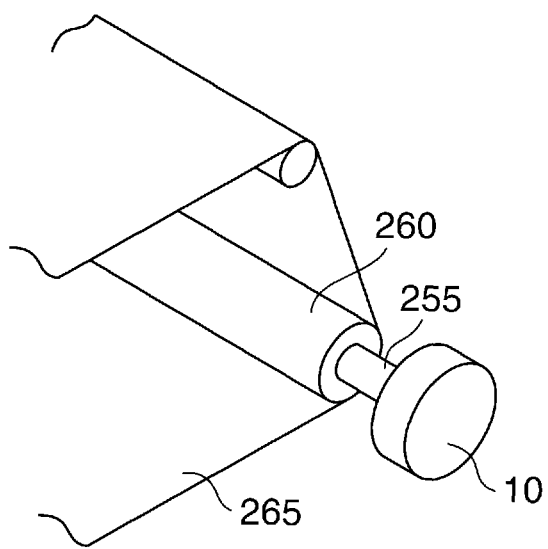
FIG. 15B is a schematic partial perspective view of a conveying belt as a component of the color image forming apparatus shown in FIG. 14.

FIG. 15B is a schematic partial perspective view of a conveying belt as a component of the color image forming apparatus shown in FIG. 14. For example, the vibration actuator 10 can be directly connected to the drive shaft 255 of a drive roller 260 (which corresponds to the drive roller 223) for the conveying belt, denoted by reference numeral 265 (which corresponds to the conveying belt 225). By driving the conveying belt 265 as above, it is possible to obtain the same advantageous effects as obtained when the photosensitive drum is driven by the vibration actuator 10.

The seventh embodiment is an example in which the vibration element 80 described in the fourth embodiment is applied to an image pickup apparatus.

Figure 16A:
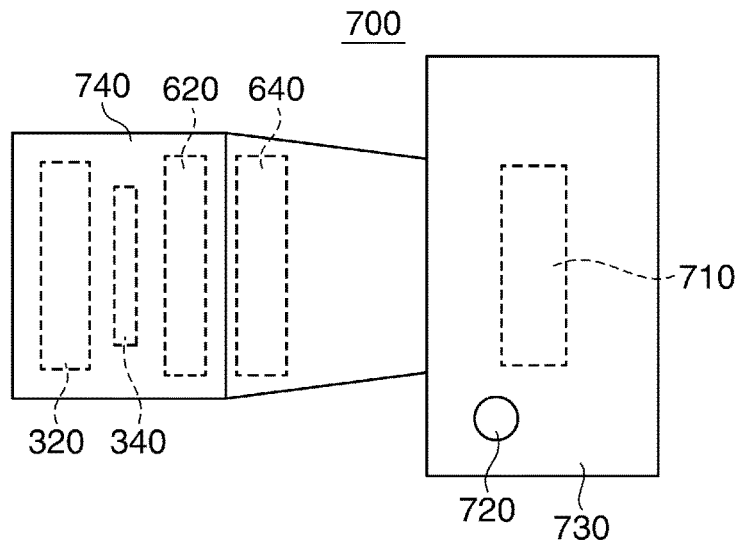
FIG. 16A is a schematic top view of an image pickup apparatus using the vibration element shown in FIGS. 12A to 12D.

FIG. 16A is a schematic top view of the image pickup apparatus, denoted by reference numeral 700, which uses the vibration element shown in FIGS. 12A to 12D. The image pickup apparatus 700 includes a camera body 730 equipped with an image pickup device 710 and a power button 720. Further, the image pickup apparatus 700 is equipped with a lens barrel 740 including a first lens group (not shown), a second lens group 320, a third lens group (not shown), a fourth lens group 340, and vibration actuator devices 620 and 640. The lens barrel 740, as an interchangeable lens, can be replaced by another, and the lens barrel 740, which is suited to an object to be photographed, can be mounted on the camera body 730. In the image pickup apparatus 700, the second lens group 320 and the fourth lens group 340 are driven by the two vibration actuator devices 620 and 640, respectively.

The vibration actuator device 620 includes vibration elements 80 described in the first embodiment, an annular driven element, and a drive circuit for applying a driving voltage to the piezoelectric element 82 of each vibration element 80. The driven element is set within the lens barrel 740 in such a manner that a radial direction thereof is substantially orthogonal to the optical axis. The driven element, in a state set in the lens barrel 740, has a sliding surface substantially orthogonal to the optical axis. The vibration elements 80, the number of which is three, for example, are fixed to an annular base at equally-spaced intervals on the circumference about the optical axis such that the contact portions 85 are brought into pressure contact with the sliding surface of the driven element to thereby apply a thrust to the driven element in a direction of a tangential line of a circle about the optical axis. Note that the method of driving the vibration element 80 has already been described in the fourth embodiment, and hence description thereof is omitted. With this configuration, in the vibration actuator device 620, the driven element is rotated about the optical axis, and the rotational output of the driven element is converted to linear movement in the optical axis direction e.g. via a gear, whereby it is possible to move the second lens group 320 in the optical axis direction. The vibration actuator device 640 has the same configuration as the vibration actuator device 620, and thereby moves the fourth lens group 340 in the optical axis direction.

Figure 16B:
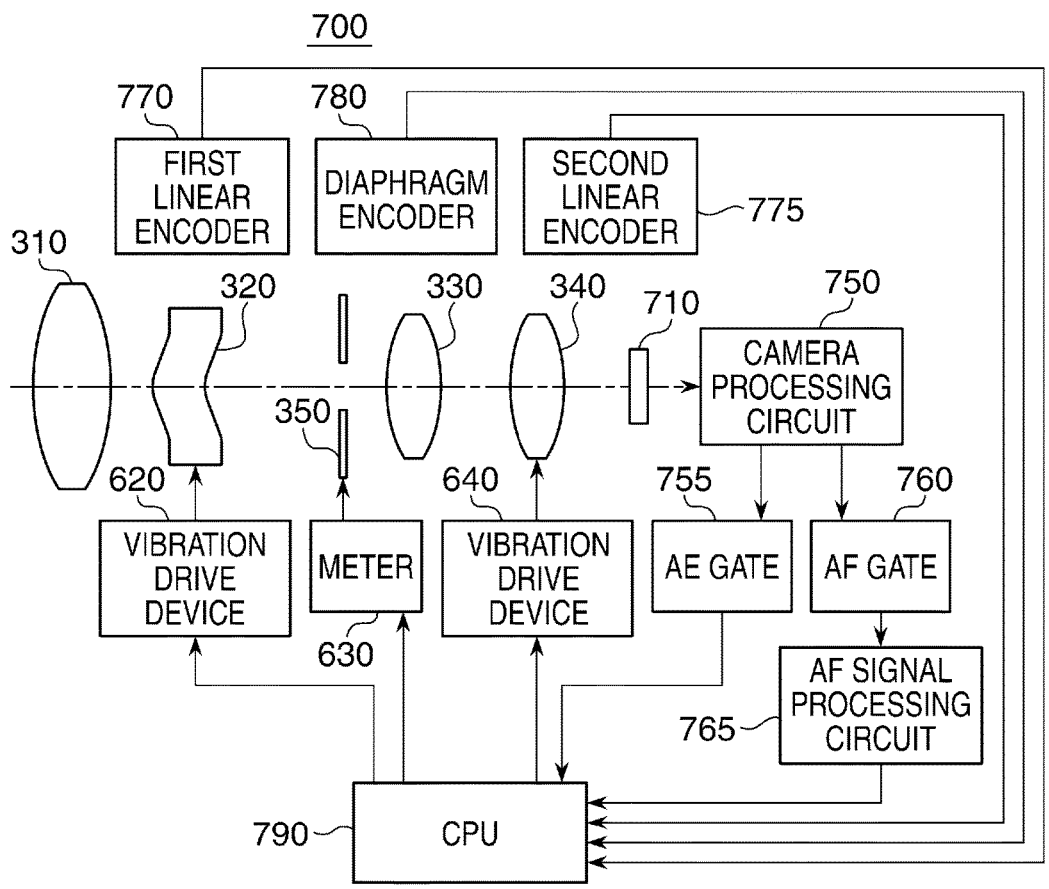
FIG. 16B is a schematic block diagram of the image pickup apparatus using the vibration element shown in FIGS. 12A to 12D.

FIG. 16B is a schematic block diagram of the image pickup apparatus 700 which uses the vibration element shown in FIGS. 12A to 12D. The first lens group, denoted by reference numeral 310, the second lens group 320, the third lens group, denoted by reference numeral 330, the fourth lens group 340, and a light amount adjustment unit 350 are arranged at respective predetermined locations on the optical axis within the lens barrel 740. Light having passed through the first to fourth lens groups 310 to 340 and the light amount adjustment unit 350 forms an image on the image pickup device 710. The image pickup device 710 converts the optical image to electric signals, and outputs the electric signals, which are sent to a camera processing circuit 750.

The camera processing circuit 750 performs amplification, gamma correction, and so forth, on the signals output form the image pickup device 710. The camera processing circuit 750 is connected to a CPU 790 via an AE gate 755, and is connected to the CPU 790 via an AF gate 760 and an AF signal processing circuit 765. A video signal subjected to predetermined processing by the camera processing circuit 750 is sent to the CPU 790 via the AE gate 755, and via the AF gate 760 and the AF signal processing circuit 765. Note that the AF signal processing circuit 765 extracts high-frequency components from the video signal to thereby generate an evaluation value signal for auto focus (AF), and supplies the generated evaluation value signal to the CPU 790.

The CPU 790 is a control circuit that controls the overall operation of the image pickup apparatus 700, and generates control signals for exposure determination and focus adjustment based on the acquired video signal. The CPU 790 controls the driving of the vibration actuator devices 620 and 640 and a meter 630 to thereby adjust positions of the second lens group 320, the fourth lens group 340, and the light amount adjustment unit 350, in the optical axis direction, so as to obtain the determined exposure and a proper focus state. Under the control of the CPU 790, the vibration actuator device 620 moves the second lens group 320 in the optical axis direction, and the vibration actuator device 640 moves the fourth lens group 340 in the optical axis direction, while the meter 630 controls the driving of the light amount adjustment unit 350.

A first linear encoder 770 detects the position of the second lens group 320, driven by the vibration actuator device 620, in the optical axis direction, and a detection result is notified to the CPU 790, whereby the detection result is fed back to the driving of the vibration actuator device 620. Similarly, a second linear encoder 775 detects the position of the fourth lens group 340, driven by the vibration actuator device 640, in the optical axis direction, and a detection result is notified to the CPU 790, whereby the detection result is fed back to the driving of the vibration actuator device 640. A diaphragm encoder 780 detects the position of the light amount adjustment unit 350 in the optical axis direction, and a detection result is notified to the CPU 790, whereby the detection result is fed back to the driving of the meter 630.

In a case where the vibration actuator or the like is used for moving a predetermined lens group in the optical axis direction, a large holding force is maintained even in a state in which the lens group is stopped. This makes it possible to prevent the lens group from being displaced even when an external force acts on the lens barrel or the body of the image pickup apparatus.

Although in the present example, the description is given of the example in which the lens groups are moved in the optical axis direction using the vibration actuator devices 620 and 640 each including the annular driven element, the configuration for moving the lens groups in the optical direction, using the vibration actuator (vibration elements), is not limited to this. For example, the vibration elements 80 can drive the driven element in a direction connecting the protrusions 81b, as described in the first embodiment. Therefore, with a configuration in which a holding member holding the lens is mounted on the driven element and the optical axis direction of the lens and the direction of driving the driven element are made substantially parallel to each other, it is possible to move the lens groups in the optical axis direction. Further, it is possible to move the lens group in the optical axis direction, also with a configuration in which the rotational output from the vibration actuator 10, described in the first embodiment, is converted to linear movement in the optical axis direction using a gear or the like.

Note that in a case where a camera shake correction lens is incorporated in the lens barrel, the vibration element 280 can be used for a camera shake correction unit that moves the camera shake correction lens in a desired direction within a plane substantially orthogonal to the optical axis. In this case, to enable the lens holding member to move in two directions orthogonal to each other within the plane substantially orthogonal to the optical axis, one or a plurality of vibration elements 280 for driving the lens holding member is/are arranged. The camera shake correction unit may have a configuration in which the image pickup device 710 incorporated in the image pickup apparatus main unit is moved in a desired direction within the plane substantially orthogonal to the optical axis, in place of the configuration for driving the camera shake correction lens.

The eighth embodiment is an example in which the vibration element 80 described in the fourth embodiment is applied to a microscope including an X-Y stage, and at least two or more vibration elements 80 are provided.

Figure 17:
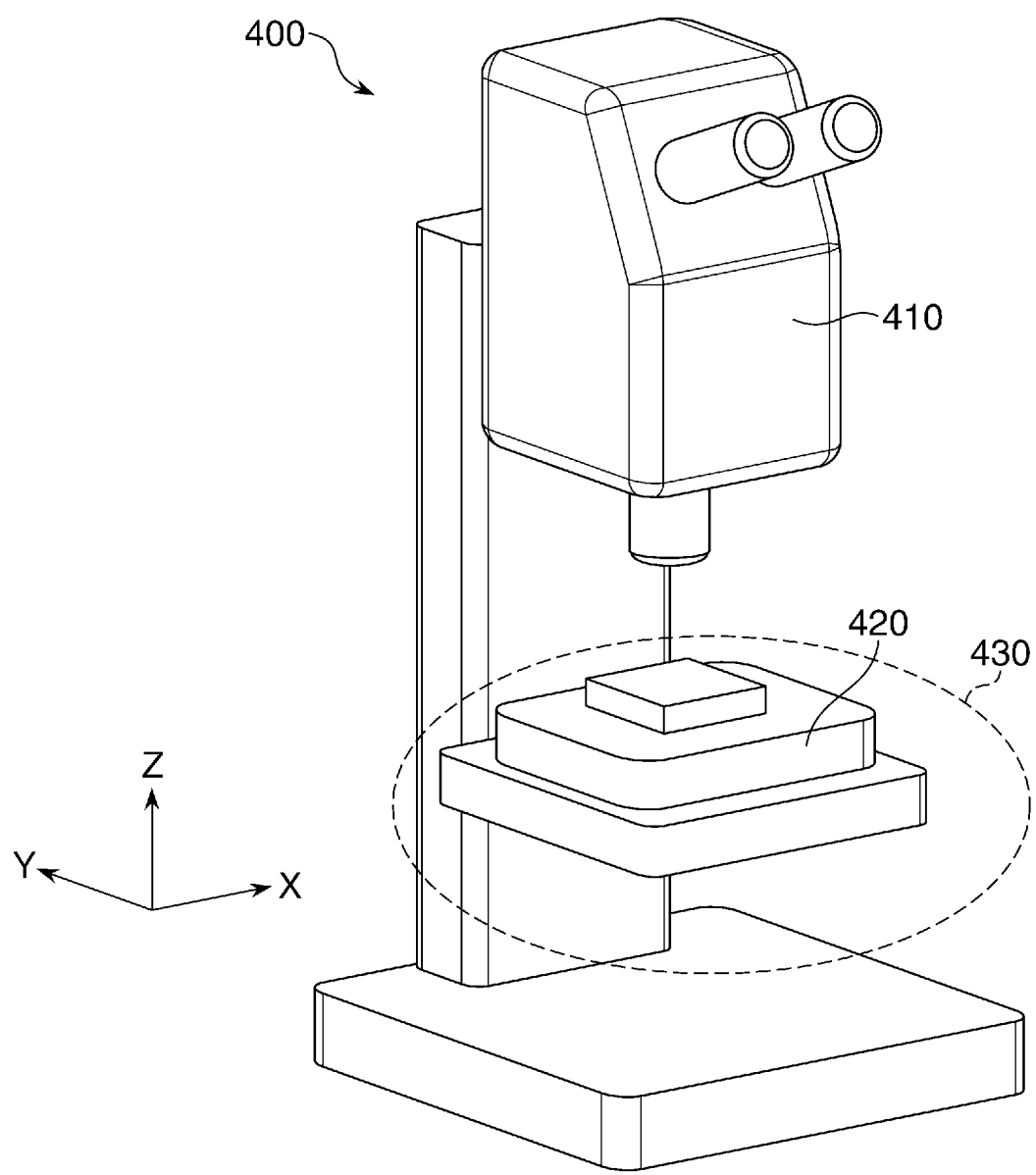
FIG. 17 is a perspective view of the appearance of a microscope as an example of a stage apparatus using the vibration element shown in FIGS. 12A to 12D.

FIG. 17 is a perspective view of the appearance of the microscope, denoted by reference numeral 400 as an example of a stage apparatus using the vibration elements each shown in FIGS. 12A to 12D. The microscope 400 includes an image pickup section 410 that incorporates an image pickup device and an optical system, and an automatic stage 430 provided on a base, which is an example of a stage device including a stage 420 which is moved within an X-Y plane by the vibration elements 80. At least one vibration element 80 is used for driving the stage in the X direction, and is set such that a direction connecting the two protrusions 81b of the vibration element 80 matches the X direction of the stage 420. Further, at least one vibration element 80 is used for driving the stage in the Y direction, and is set such that the direction connecting the two protrusions 81b of the vibration element 80 matches the Y direction of the stage 420. Note that the method of driving the vibration element 80 has already been described in the fourth embodiment, and hence description thereof is omitted.

An object to be observed is placed on an upper surface of the stage 420, and an enlarged image is photographed by the image pickup section 410. In a case where an observation range is wide, the automatic stage 430 is driven to move the stage 420 in the X direction and the Y direction within the plane to thereby move the object to be observed, whereby a multiplicity of photographed images are acquired. By combining the photographed images by a computer, not shown, it is possible to acquire one wide-range image with high resolution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, in the first embodiment, the contact spring 31b for stabilizing the contact state between the vibration element 20 and the driven element 30 is provided on the driven element 30. However, this is not limitative, but the contact spring may be provided on one of the vibration element 20 and the driven element 30 at a location where the one of the vibration element 20 and the driven element 30 is brought into contact with the other, and more specifically, the contact spring 31b may be provided on the vibration element 20.

This application claims the benefit of Japanese Patent Application No. 2015-237395 filed Dec. 4, 2015, which is hereby incorporated by reference herein in its entirety.

What is claimed is:

1. A method of driving a vibration actuator that includes a vibration element including an electromechanical energy conversion element and an elastic body which is joined to the electromechanical energy conversion element, and a contact element which is brought into pressure contact with the elastic body, the method comprising:
exciting driving vibration in the vibration element by applying a drive signal to the electromechanical energy conversion element, to thereby move the vibration element and the contact element relative to each other, wherein the driving vibration is a combined vibration of at least n-th-order vibration and 2n-th-order vibration having a phase difference, n being a number of waves in a direction of relative movement of the vibration element and the contact element, and
wherein by setting a natural frequency of the 2n-th-order vibration to approximately two times a natural frequency of the n-th-order vibration, the two vibrations are excited.

2. The method according to claim 1, wherein both of the n-th-order vibration and the 2n-th-order vibration are bending vibrations.

3. The method according to claim 1, wherein a contact portion of the elastic body, which is brought into contact with the contact element, is caused to perform elliptical motion by the driving vibration, and
wherein the maximum value of an absolute value of a speed of the elliptical motion in the same direction as a driving direction of the contact element is made lower than the maximum value of an absolute value of a speed of the elliptical motion in a direction opposite to the driving direction.

4. The method according to claim 1, wherein the natural frequency of the 2n-th-order vibration is set to 1.85 to 2.30 times the natural frequency of the n-th-order vibration.

5. The method according to claim 1, wherein the phase difference equals $\theta_n - \theta_{2n}$, where $\theta_n$ is a phase of the n-th order vibration and $\theta_{2n}$ is a phase of the 2n-th-order vibration.

6. The method according to claim 5, wherein the phase difference is 90°.

7. A vibration drive device including:
a vibration actuator; and
a drive circuit for driving the vibration actuator,
wherein the vibration actuator comprises:
an electromechanical energy conversion element,
a vibration element including an elastic body which is joined to the electromechanical energy conversion element, and
a contact element which is brought into pressure contact with the elastic body,
wherein the drive circuit applies a drive signal to the electromechanical energy conversion element, for exciting driving vibration in which at least n-th-order vibration and 2n-th-order vibration having a phase difference are combined, n being a number of waves in a direction of relative movement of the vibration element and the contact element, in the vibration element, and moves the vibration element and the contact element relative to each other by the driving vibration, and
wherein by setting a natural frequency of the 2n-th-order vibration to approximately two times a natural frequency of the n-th-order vibration, the two vibrations are excited.

8. The vibration drive device according to claim 7, wherein both of the n-th-order vibration and 2n-th-order vibration are bending vibrations.

9. The vibration drive device according to claim 7, wherein a contact portion of the elastic body, which is brought into contact with the contact element, is caused to perform elliptical motion by the driving vibration, and
wherein the maximum value of an absolute value of a speed of the elliptical motion in the same direction as a driving direction of the contact element is lower than the maximum value of an absolute value of a speed of the elliptical motion in a direction opposite to the driving direction.

10. The vibration drive device according to claim 7, wherein a natural frequency of the 2n-th-order vibration is 1.85 to 2.30 times a natural frequency of the n-th-order vibration.

11. The vibration drive device according to claim 7, wherein the vibration actuator includes a pressure unit configured to bring the vibration element and the contact element into pressure contact with each other, and
wherein a contact spring that receives a pressure force from the pressure unit and is bent in a direction of the pressure force is provided on a portion of one of the elastic body and the contact element that is brought into contact with the other.

12. The vibration drive device according to claim 7, wherein a contact portion of the vibration element, which is brought into contact with the contact element, and a contact portion of the contact element, which is brought into contact with the vibration element, are made of a ferrous material or a ferrous material subjected to nitriding treatment.

13. The vibration drive device according to claim 7, wherein the elastic body includes:
an annular base portion, and
a plurality of protrusions formed on the same circumference at substantially equally-spaced intervals in a manner protruding from the base portion in a thickness direction of the base portion,
wherein the contact element has an annular shape, and is brought into pressure contact with upper surfaces of the protrusions in the thickness direction,
wherein the electromechanical energy conversion element is joined to a surface of the base portion opposite to a surface on which the plurality of protrusions are formed, and
wherein the contact element is frictionally driven by the protrusions, whereby the elastic body and the contact element are rotationally moved relative to each other in a circumferential direction.

14. The vibration drive device according to claim 7, wherein the vibration element includes a shaft,
wherein the elastic body and the electromechanical energy conversion element each have an annular shape and are fixed to the shaft in a state in which the shaft extends therethrough,
wherein the contact element has an annular shape, and is disposed around the shaft such that the elastic body is arranged between the electromechanical energy conversion element and the contact element, whereby the contact element is brought into pressure contact with the elastic body, and
wherein the contact element is frictionally driven by driving vibration excited in the elastic body, whereby the elastic body and the contact element are rotationally moved relative to each other in a circumferential direction about the shaft.

15. The vibration drive device according to claim 7, wherein the elastic body has a plate-like shape,
wherein the vibration element includes two protrusions formed on one surface of the elastic body with a predetermined spacing therebetween,
wherein the electromechanical energy conversion element is joined to the other surface of the elastic body opposite to the one surface on which the protrusions are formed,
wherein the contact element is brought into pressure contact with extremity end surfaces of the protrusions in a direction in which the protrusions protrude, and
wherein the contact element is frictionally driven by the protrusions, whereby the elastic body and the contact element are moved relative to each other in a direction connecting the two protrusions.

16. The vibration drive device according to claim 7, wherein the phase difference equals $\theta_n$-$\theta_{2n}$, where $\theta_n$ is a phase of the n-th-order vibration and $\theta_{2n}$ is a phase of the 2n-th-order vibration.

17. The vibration drive device according to claim 16, wherein the phase difference is 90°.

18. A mechanical apparatus including a vibration drive device,
the vibration drive device including:
a vibration actuator; and
a drive circuit for driving the vibration actuator,
wherein the vibration actuator comprises:
an electromechanical energy conversion element;
a vibration element including an elastic body which is joined to the electromechanical energy conversion element; and
a contact element which is brought into pressure contact with the elastic body,
wherein the drive circuit applies a drive signal to the electromechanical energy conversion element for exciting driving vibration in which at least n-th-order vibration and 2n-th-order vibration having a phase difference are combined, n being a number of waves in a direction of relative movement of the vibration element and the contact element, in the vibration element, and moves the vibration element and the contact element relative to each other by the driving vibration,
wherein by setting a natural frequency of the 2 n-th-order vibration to approximately two times a natural frequency of the n-th-order vibration, the two vibrations are excited, and
wherein the vibration actuator included in the vibration drive device is used as a drive source.

19. The mechanical apparatus according to claim 18, wherein a natural frequency of the 2n-th-order vibration is 1.85 to 2.30 times a natural frequency of the n-th-order vibration.

20. The mechanical apparatus according to claim 18, wherein the phase difference equals $\theta_n$−$\theta_{2n}$, where $\theta_n$ is a phase of the n-th-order vibration and $\theta_{2n}$ is a phase of the 2n-th-order vibration.

21. The mechanical apparatus according to claim 20, wherein the phase difference is 90°.

22. A vibration drive device including:
a vibration actuator; and
a drive circuit for driving the vibration actuator,
wherein the vibration actuator comprises:
an electromechanical energy conversion element,
a vibration element including an elastic body which is joined to the electromechanical energy conversion element, and
a contact element which is brought into pressure contact with the elastic body,
wherein the drive circuit applies a drive signal to the electromechanical energy conversion element, for exciting driving vibration in which at least an n-th-order traveling wave and a 2n-th-order traveling wave having a phase difference are combined, n being a natural number of waves in a direction of relative movement of the vibration element and the contact element, in the vibration element, and moves the vibration element and the contact element relative to each other by the driving vibration.

23. The vibration drive device according to claim 22, wherein both of the n-th-order traveling wave and the 2n-th-order traveling wave are bending vibrations.

24. The vibration drive device according to claim 22, wherein a contact portion of the elastic body, which is brought into contact with the contact element, is caused to perform elliptical motion by the driving vibration, and wherein the maximum value of an absolute value of a speed of the elliptical motion in the same direction as a driving direction of the contact element is made lower than the maximum value of an absolute value of a speed of the elliptical motion in a direction opposite to the driving direction.

25. The vibration drive device according to claim 22, wherein a natural frequency in the vibration element of the 2n-th-order traveling wave is set to a specific value between 1.85 to 2.30 times of a natural frequency in the vibration element of the n-th-order traveling wave.

26. The vibration drive device according to claim 22, wherein a natural frequency in the vibration element of the 2n-th-order traveling wave is set to approximately 2 times of a natural frequency in the vibration element of the n-th-order traveling wave.

27. The vibration drive device according to claim 22, wherein the phase difference equals $\theta_n - \theta_{2n}$, where $\theta_n$ is a phase of the n-th-order traveling wave in an amplitude of the n-th-order traveling wave expressed by $A_n \sin(\omega_n t + \theta_n)$ and $\theta_{2n}$ is a phase of the 2n-th-order traveling wave in an amplitude of the 2n-th-order traveling wave expressed by $A_n \sin(\omega_n t + \theta_{2n})$, where $A_n$, $A_{2n}$ and $\theta_n$ respectively represent a maximum of the n-th order traveling wave, a maximum of the amplitude of the 2n-th-order traveling wave and a frequency of the n-th-order traveling wave.

28. The vibration drive device according to claim 27, wherein the phase difference is 90°.

* * * * *